(12) United States Patent
Sun et al.

(10) Patent No.: US 11,741,657 B2
(45) Date of Patent: Aug. 29, 2023

(54) IMAGE PROCESSING METHOD, ELECTRONIC DEVICE, AND STORAGE MEDIUM

(71) Applicant: BEIJING XIAOMI MOBILE SOFTWARE CO., LTD., Beijing (CN)

(72) Inventors: Yang Sun, Beijing (CN); Junzeng Du, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/588,166

(22) Filed: Jan. 28, 2022

(65) Prior Publication Data
US 2023/0017538 A1 Jan. 19, 2023

(30) Foreign Application Priority Data
Jul. 15, 2021 (CN) .......................... 202110803231.6

(51) Int. Cl.
*G06T 15/04* (2011.01)
*G06T 7/30* (2017.01)
*G06T 11/40* (2006.01)
*G06T 19/20* (2011.01)

(52) U.S. Cl.
CPC ................ *G06T 15/04* (2013.01); *G06T 7/30* (2017.01); *G06T 11/40* (2013.01); *G06T 19/20* (2013.01); *G06T 2219/2004* (2013.01)

(58) Field of Classification Search
CPC . G06T 15/04; G06T 7/30; G06T 11/40; G06T 19/20; G06T 2219/2004; G06T 19/006
See application file for complete search history.

(56) References Cited

U.S. PATENT DOCUMENTS

| | | | |
|---|---|---|---|
| 2006/0026628 A1 | 2/2006 | Wan et al. | |
| 2013/0155058 A1* | 6/2013 | Golparvar-Fard | G06Q 10/06311 345/419 |
| 2014/0168262 A1 | 6/2014 | Forutanpour et al. | |
| 2017/0201735 A1* | 7/2017 | Tyshchenko | G06T 13/00 |
| 2019/0057532 A1* | 2/2019 | Marzban | G06T 7/536 |
| 2020/0302681 A1* | 9/2020 | Totty | G06T 7/74 |
| 2021/0019912 A1* | 1/2021 | Cutler | H04N 17/002 |
| 2021/0142497 A1* | 5/2021 | Pugh | G06T 7/55 |
| 2021/0248816 A1* | 8/2021 | Yang | G06T 17/00 |
| 2022/0277193 A1* | 9/2022 | Wekel | G06V 20/56 |

OTHER PUBLICATIONS

European Patent Application No. 22154283.0, Search and Opinion dated Jul. 26, 2021, 14 pages.
Simon, G. "Automatic Online Walls Detection for Immediate Use in AR Tasks", Oct. 2006 IEEE/ACM International Symposium on Mixed and Augmented Reality, 2006, pp. 39-42.
European Patent Application No. 22154283.0, Search and Opinion dated Dec. 7, 2022, 15 pages.

* cited by examiner

*Primary Examiner* — YuJang Tswei
(74) *Attorney, Agent, or Firm* — COZEN O'CONNOR (57) ABSTRACT

An image processing method includes: determining an area to be processed according to a line feature in an image frame to be processed; building a space model according to the image frame to be processed; and embedding a special effect material to be embedded into the area to be processed according to the space model, to generate a special effect image frame.

17 Claims, 6 Drawing Sheets

IMAGE PROCESSING METHOD, ELECTRONIC DEVICE, AND STORAGE MEDIUM

CROSS-REFERENCE TO RELATED APPLICATIONS

This application is based on and claims priority to the Chinese Patent Application No. 202110803231.6, filed on Jul. 15, 2021, the entire content of which is incorporated herein by reference.

TECHNICAL FIELD

The present disclosure relates to the field of computer vision, specifically to the field of Augmented Reality (AR) technology, and more specifically to an image processing method and apparatus, and an electronic device.

BACKGROUND

With the development of the Augmented Reality (AR) technologies, it has becoming widely used in a greater variety of applications. Accordingly there is an urgent need to further develop a visual effect for an AR scene presented by the AR device to a user.

At present, embedding an AR special effect relies on professional special effect software, which requires a high learning curve and cost for most users to learn. Moreover, embedding a special effect is step-cumbersome, time-consuming and unintelligent. AR technologies lack an efficient solution for embedding a special effect material.

SUMMARY

An image processing method includes determining an area to be processed according to a line feature in an image frame to be processed; building a space model according to the image frame to be processed; and embedding a special effect material to be embedded into the area to be processed according to the space model, to generate a special effect image frame.

An electronic device includes at least one processor, and a memory, connected in communication with said at least one processor, in which the memory stores therein an instruction executable by said at least one processor, in which said at least one processor is configured to: determine an area to be processed according to a line feature in an image frame to be processed; build a space model according to the image frame to be processed; and embed a special effect material to be embedded into the area to be processed according to the space model, to generate a special effect image frame.

A non-transitory computer-readable storage medium having stored therein a computer instruction is provided. The computer instruction is configured to cause a computer to implement an image processing method as mentioned above, in which the method includes: determining an area to be processed according to a line feature in an image frame to be processed; building a space model according to the image frame to be processed; and embedding a special effect material to be embedded into the area to be processed according to the space model, to generate a special effect image frame.

BRIEF DESCRIPTION OF THE DRAWINGS

Drawings are explanatory, serve to explain the disclosure, and are not construed to limit embodiments of the disclosure.

DETAILED DESCRIPTION

Illustrative embodiments of the present disclosure are described below with reference to the drawings, where various details of the embodiments of the present disclosure are included to facilitate understanding and should be considered as illustrative only. Accordingly, those of ordinary skill in the art will recognize that various changes and modifications of the embodiments described herein can be made without departing from the scope and spirit of the present disclosure. Also, descriptions of well-known functions and constructions are omitted from the following description for clarity and conciseness.

The Augmented Reality (hereinafter referred to as AR) technology involves simulating physical information (such as visual, sound, and touch information) and superimposing the same into the real world, thus presenting the real environment and a virtual object in one frame or space in a real-time manner. In recent years, an increasing number of areas are applying AR technology to devices, and accordingly there is an urgent need to further develop a visual effect for an AR scene presented by the AR device.

At present, an AR special effect is embedded one frame-by-one frame for a video to be processed, resulting in huge calculation costs and low efficiency. There is still a lack of an efficient solution to embed the AR special effect presently.

Currently, many manufactures are striving to develop a camera, which is a link for playing the AR technology. However, professional special effect software (such as "Adobe After Effect") is used to manually set a plane, a point and a line for an image frame, and further for space modelling; and to manually bond the AR special effect material to the plane, the point and the line which are set, thus finally obtaining a video with the AR special effect. It will take a certain cost for most users to learn how to use the professional special effect software. Besides, embedding the AR special effect with the professional special effect software is step-cumbersome and time-consuming, as well as low efficiency and high cost for the manual operation.

It should be noted that the image processing method provided in embodiments of the present disclosure is applicable to processing an image in an album, or to processing image frames as they are captured.

Figure 1:
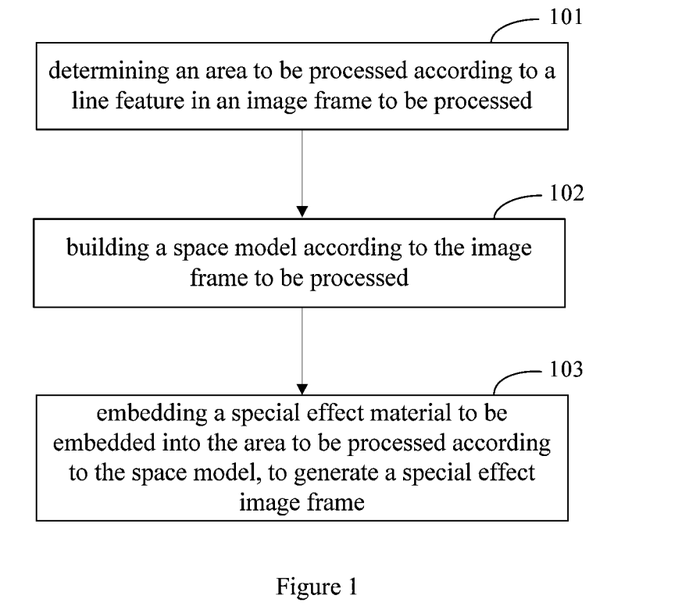
FIG. 1 is a flow chart illustrating an image processing method according to embodiments of the present disclosure.

FIG. 1 is a flow chart illustrating an image processing method according to embodiments of the present disclosure. Referring to FIG. 1, the image processing method may include steps 101, 102 and 103.

At the step 101, an area to be processed is determined according to a line feature in an image frame to be processed.

For embedding a special effect material (such as an AR special effect material) into the image frame to be processed, it is needed to process the image frame to be processed in advance to generate an image of the area to be processed. In embodiments of the present disclosure, the area to be processed may be selected from one of a building, a window, a guidepost, a road sign, a road and the like, or a combination thereof. These areas to be processed each are encompassed by a definite line feature, so the line feature in the image frame to be processed is acquired to generate the area to be processed.

In some embodiments, an area type (also called building type) of the area to be processed may be selected from one of a building, a window, a guidepost, a road sign, a road and the like, or a combination thereof.

Meanwhile, in order to reduce the calculation for embedding the special effect material (such as the AR special effect material), in embodiments of the present disclosure, the image processing method includes setting a label for each area to be processed, and embedding the same special effect material (such as the AR special effect material) into two areas to be processed with a same label, based on that the area labels of the areas to be processed are same between adjacent image frames to be processed.

At the step 102, a space model is built according to the image frame to be processed.

For accurately embedding the special effect material (such as the AR special effect material) into the area to be processed, it is needed to acquire three-dimensional coordinates of the area to be processed. At this step, a space model is built according to the line feature in the image frame to be processed, to acquire the three-dimensional coordinates of the area to be processed. The method to establish a three-dimensional space model according to a two-dimensional image is numerous and well-known in the art, which is not covered by the protection scope of the present disclosure. In a possible embodiment, several reference points are selected on the line, two-dimensional coordinates of individual reference points are acquired, and three-dimensional coordinates of the individual reference points are calibrated. A projection matrix is acquired according to the two-dimensional coordinates and the three-dimensional coordinates of the individual reference points, and three-dimensional coordinates corresponding to the pixels on the line are obtained according to the projection matrix. Further, the space model is generated accordingly.

At the step 103, a special effect material to be embedded is embedded into the area to be processed according to the space model, to generate a special effect image frame.

In some embodiments, three-dimensional coordinates of pixels in the image of the area to be processed may be obtained according to the space model. It is needed to embed the special effect material to be embedded (such as the AR special effect material), after homography transformation, into the area to be processed in the space model.

The homography transformation may be achieved according to a homography matrix. The homography transformation is a mapping relationship from one plane to another plane. As the area to be processed is not necessarily facing a camera that collects the image frame to be processed, the special effect material to be embedded (such as the AR special effect material) should be distorted to a certain extent in a vision field of the camera, and the sense of reality of the special effect image frame will be stronger accordingly.

In some embodiments, the image processing method in this embodiment may be applied to processing an image after shooting, for example processing an image (including a dynamic image and a static image) and/or a video in the album, or may be further applied to processing image frames during photographing, such as processing shooting during photographing.

Figure 10:
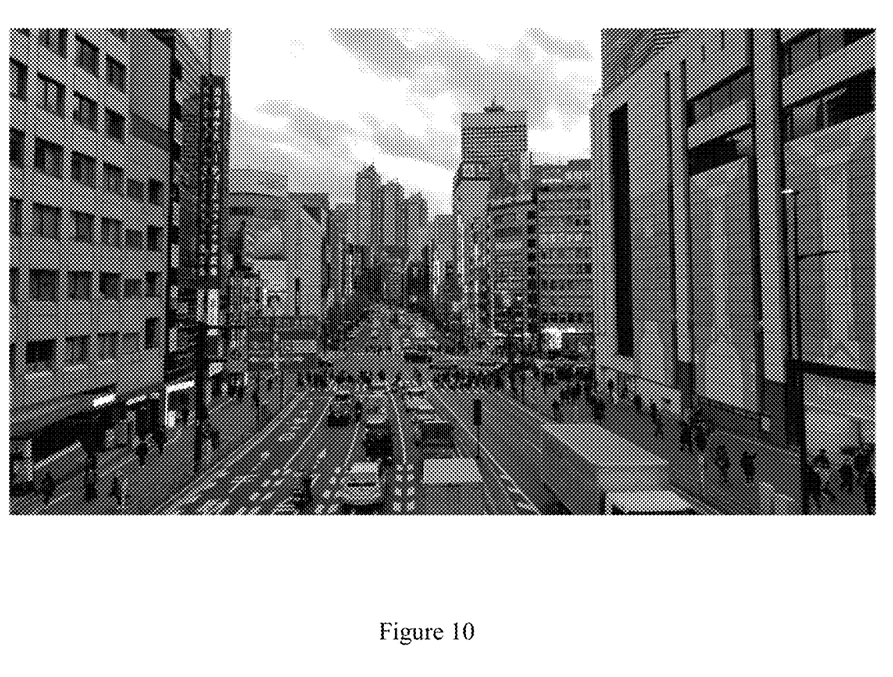
FIG. 10 is a scene graph illustrating an image frame to be processed according to embodiments of the present disclosure.
Figure 11:
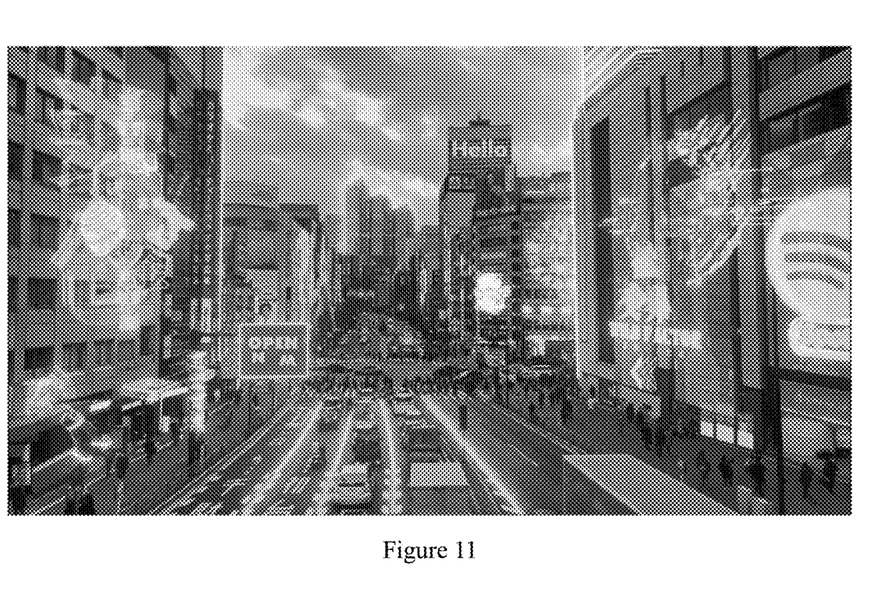
FIG. 11 is a scene graph illustrating a special effect-embedded image frame according to embodiments of the present disclosure.

FIG. 10 is a scene graph illustrating an image frame to be processed according to embodiments of the present disclosure; and FIG. 11 a scene graph illustrating a special effect-embedded image frame according to embodiments of the present disclosure. As shown in FIG. 11, the special effect material to be embedded is added to the buildings in the scene graph of the special effect image frame.

Figure 2:
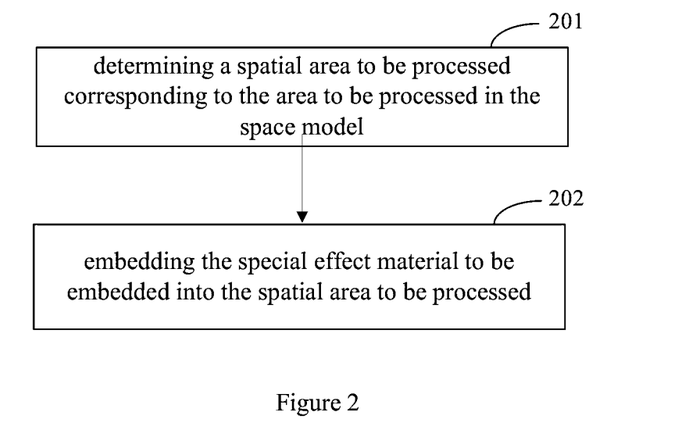
FIG. 2 is a flow chart illustrating an image processing method according to embodiments of the present disclosure.

FIG. 2 is a flow chart illustrating an image processing method according to embodiments of the present disclosure. Referring to FIG. 2, the image processing method includes: steps 201 and 202.

At the step 201, a spatial area to be processed corresponding to the area to be processed in the space model is determined.

The spatial area to be processed is a three-dimensional space, if the material to be embedded is a three-dimensional special effect material, and a material to be embedded is embedded into the spatial area to be processed. The area to be processed is a two-dimensional space, if the material to be embedded is a two-dimensional special effect material, and the material to be embedded is embedded into the spatial area to be processed.

At the step 202, the special effect material to be embedded is embedded into the spatial area to be processed.

An objective plane is determined based on the line feature in the area to be processed, and the spatial area to be processed, which is formed based on the objective plane, is determined according to the objective plane.

In some embodiments, the spatial area to be processed (which is formed based on a building plane) is determined based on the building plane corresponding to the area to be processed (such as a building wall, a road surface, a road sign surface and the like).

In some embodiments, the method further includes one or more of:

determining the special effect material to be embedded according to a type of the spatial area to be processed; and determining a building type correspondingly according to the area to be processed, and determining the special effect material to be embedded according to the building type.

In some embodiments, an area type (also called building type) of the area to be processed may be selected from one of a building, a window, a guidepost, a road sign, a road and the like, or a combination thereof.

In some embodiments, the type of the spatial area to be processed includes a three-dimensional space and a two-dimensional space.

In some embodiments, the spatial area to be processed is a three-dimensional space, if the material to be embedded is a three-dimensional special effect material, and a material to be embedded is embedded into the spatial area to be processed. The area to be processed is a two-dimensional space, if the material to be embedded is a two-dimensional special effect material, and the material to be embedded is embedded into the spatial area to be processed.

In some embodiments, an objective plane is determined based on the line feature in the area to be processed, and the spatial area to be processed, which is formed based on the objective plane, is determined according to the objective plane.

In some embodiments, the spatial area to be processed (which is formed based on a building plane) is determined based on the building plane corresponding to the area to be processed (such as a building wall, a road surface, a road sign surface and the like).

In some embodiments, the size of the special effect material to be embedded corresponds to that of the spatial area to be processed or of the area to be processed.

For making the embedded special effect to fit the spatial area to be processed or the area to be processed better, the special effect material to be embedded is of a size corresponding to that of the spatial area to be processed or of the area to be processed.

In some embodiments, the special effect material to be embedded after the processing of homography transformation, is of a size corresponding to that of the spatial area to be processed or of the area to be processed.

Meanwhile, the special effect material to be embedded is embedded to an external surface of the spatial area to be processed.

Figure 3:
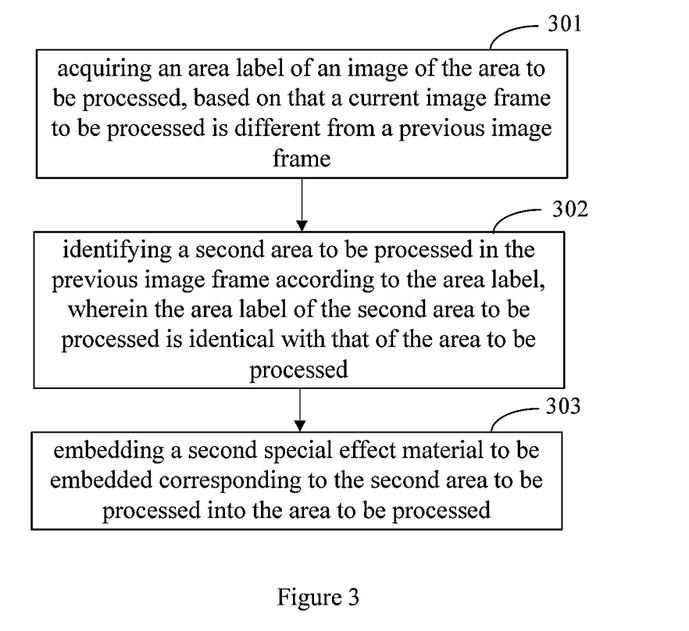
FIG. 3 is a flow chart illustrating an image processing method according to embodiments of the present disclosure.

FIG. 3 is a flow chart illustrating an image processing method according to embodiments of the present disclosure. Referring to FIG. 3, the image processing method includes: steps 301, 302 and 303.

At the step 301, an area label of an image of the area to be processed is acquired, based on that a current image frame to be processed is different from a previous image frame.

In some embodiments, the image processing method in this embodiment may be applied to processing an image after shooting, for example processing an image including a dynamic image and/or a video in the album, or may be further applied to processing image frames during photographing, such as processing shooting during photographing. In embodiments, the image processing includes the processing of multiple image frames.

For reducing the calculation for embedding the special effect material (such as the AR special effect material), in embodiments of the present disclosure the image processing method includes setting a label for each area to be processed, and embedding the same special effect material to be embedded (such as the AR special effect material) into two areas to be processed with a same label, based on that the area labels of the areas to be processed are same between adjacent image frames to be processed.

At the step 302, a second area to be processed in the previous image frame is identified according to the area label, where the area label of the second area to be processed is identical with that of the area to be processed.

It is judged whether the area label of the area to be processed in the previous image frame is identical to that in the current image frame to be processed. If the area label of the area to be processed in the previous image frame is identical to that in the current image frame to be processed, the area to be processed in the previous image frame is set as a second area to be processed, and the area to be processed is added with the special effect material to be embedded which is same added to the second area to be processed.

At the step 303, a second special effect material to be embedded corresponding to the second area to be processed is embedded into the area to be processed.

This step achieves tracking of the same object, and further achieves tracking of the area to be processed for the special effect material (such as the AR special effect material). If the camera moves, the special effect material (such as the AR special effect material) embedded into the same area to be processed will be unchanged. If there is a moving car in the area to be processed, its corresponding special effect (such as the AR special effect) will follow the moving car all along.

Figure 4:
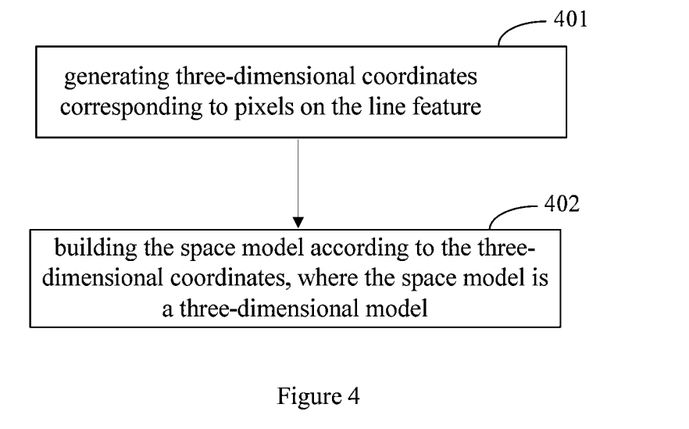
FIG. 4 is a flow chart illustrating an image processing method according to embodiments of the present disclosure.

FIG. 4 is a flow chart illustrating an image processing method according to embodiments of the present disclosure. Referring to FIG. 4, the image processing method includes: steps 401 and 402.

At the step 401, three-dimensional coordinates corresponding to pixels on the line feature are generated.

For accurately embedding the special effect material to be embedded (such as the AR special effect material) into the area to be processed, it is needed to acquire three-dimensional coordinates of the area to be processed. At this step, a space model is built according to the line feature in the image frame to be processed, to acquire the three-dimensional coordinates of the area to be processed. The method to establish a three-dimensional space model according to a two-dimensional image is numerous and well-known in the art, which is not covered by the protection scope of the present disclosure. In a possible embodiment, several reference points are selected on the line, two-dimensional coordinates of individual reference points are acquired, and three-dimensional coordinates of the individual reference points are calibrated. A projection matrix is acquired according to the two-dimensional coordinates and the three-dimensional coordinates of the individual reference points, and three-dimensional coordinates corresponding to the pixels on the line are obtained according to the projection matrix. Further, the space model is generated accordingly.

At the step 402, the space model is built according to the three-dimensional coordinates, where the space model is a three-dimensional model.

After the space model is built, respective three-dimensional coordinates of all pixels in the image of the area to be processed in the space model can be acquired, which is convenient for subsequently embedding the special effect material to be embedded (such as the AR special effect material) into the image of the area to be processed.

In some embodiments, the special effect material to be embedded includes at least one of:
a two-dimensional special effect material, and
a three-dimensional special effect material.

The two-dimensional special effect material may be embedded into the area to be processed, and the three-dimensional special effect material may be embedded into the spatial area to be processed. The material to be embedded is a material including a font interpretation material, a graphic material and the like, which is set in advance.

In a possible embodiment, image identification and spatial reconstruction are performed firstly, including:
identifying an image to be processed; building a space model; incorporating the material to be embedded according to x, y and z axes; and brightening a contour (line) of a road, a building or the like, if identifying the same.

After that, an image tracking is performed, including:

setting a video tracking point; and attaching the incorporated material to be embedded to the tracking point, where the material to be embedded is bonded to the tracking point along with camera lens moving and translating.

In some embodiments, brightening processing may be to add a brightening special effect on the material to be embedded.

Finally, the material to be embedded is embedded.

The material to be embedded is a preset modelling video material that will appear in a video in a dynamic form, and is not limited to two-dimensional dynamics, three-dimensional dynamics, font interpretation and other forms. Different preset modeling materials are added based on a type of previously identified space (i.e. the three-dimensional space) or plane (i.e. the two-dimensional space), and a feature point tracking.

Figure 5:
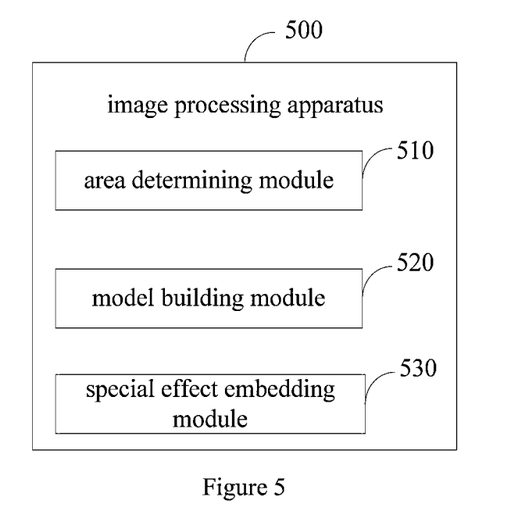
FIG. 5 is a block diagram illustrating an image processing apparatus according to embodiments of the present disclosure.

FIG. 5 is a block diagram illustrating an image processing apparatus according to embodiments of the present disclosure. Referring to FIG. 5, the image processing apparatus 500 may include: an area determining module 510, a model building module 520 and a special effect embedding module 530.

The area determining module 510 is configured to determine an area to be processed according to a line feature in an image frame to be processed.

For embedding a special effect material to be embedded (such as an AR special effect material) into the image frame to be processed, it is needed to process the image frame to be processed in advance to generate an image of the area to be processed. In embodiments of the present disclosure, the area to be processed may be selected from one of a building, a window, a guidepost, a road sign, a road and the like, or a combination thereof. These areas to be processed each are encompassed by a definite line feature, so the line feature in the image frame to be processed is acquired to generate the area to be processed.

Meanwhile, in order to reduce the calculation for embedding the special effect material (such as the AR special effect material), in embodiments of the present disclosure, the image processing method includes setting a label for each area to be processed, and embedding the same special effect material (such as the AR special effect material) into two areas to be processed with a same label, based on that the area labels of the areas to be processed are same between adjacent image frames to be processed.

The model building module 520 is configured to build a space model according to the image frame to be processed.

For accurately embedding the special effect material (such as the AR special effect material) into the area to be processed, it is needed to acquire three-dimensional coordinates of the area to be processed. At this step, a space model is built according to the line feature in the image frame to be processed, to acquire the three-dimensional coordinates of the area to be processed. The method to establish a three-dimensional space model according to a two-dimensional image is numerous and well-known in the art, which is not covered by the protection scope of the present disclosure. In a possible embodiment, several reference points are selected on the line, two-dimensional coordinates of individual reference points are acquired, and three-dimensional coordinates of the individual reference points are calibrated. A projection matrix is acquired according to the two-dimensional coordinates and the three-dimensional coordinates of the individual reference points, and three-dimensional coordinates corresponding to the pixels on the line are obtained according to the projection matrix. Further, the space model is generated accordingly.

The special effect embedding module 530 is configured to embed a special effect material to be embedded into the area to be processed according to the space model, to generate a special effect image frame.

Three-dimensional coordinates of pixels in the image of the area to be processed may be obtained according to the space model. It is needed to embed the special effect material to be embedded (such as AR special effect material), after homography transformation, into the area to be processed in the space model.

The homography transformation may be achieved according to a homography matrix. The homography transformation is a mapping relationship from one plane to another plane. As the area to be processed is not necessarily facing a camera that collects the image frame to be processed, the special effect material (such as the AR special effect material) should be distorted to a certain extent in a vision field of the camera, and the sense of reality of the special effect image frame will be stronger accordingly.

Figure 6:
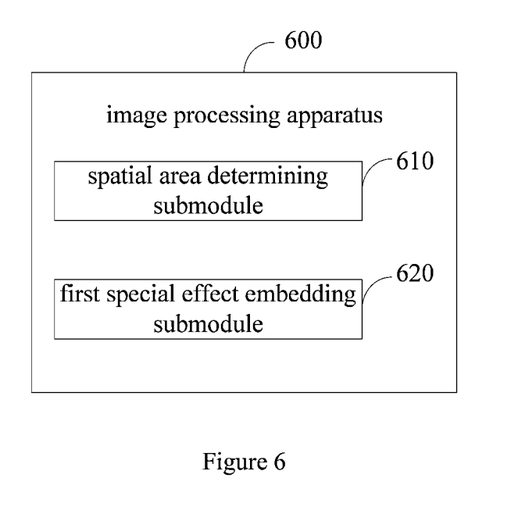
FIG. 6 is a block diagram illustrating an image processing apparatus according to embodiments of the present disclosure.

FIG. 6 is a block diagram illustrating an image processing apparatus according to embodiments of the present disclosure. Referring to FIG. 6, the image processing apparatus 600 includes: a spatial area determining submodule 610 and a first special effect embedding submodule 620.

The spatial area determining submodule 610 is configured to determine a spatial area to be processed corresponding to the area to be processed in the space model.

The spatial area to be processed is a three-dimensional space, if the material to be embedded is a three-dimensional special effect material, and a material to be embedded is embedded into the spatial area to be processed. The area to be processed is a two-dimensional space, if the material to be embedded is a two-dimensional special effect material, and the material to be embedded is embedded into the spatial area to be processed.

The first special effect embedding submodule 620 is configured to embed the special effect material to be embedded into the spatial area to be processed.

An objective plane is determined based on the line feature in the area to be processed, and the spatial area to be processed, which is formed based on the objective plane, is determined according to the objective plane.

In some embodiments, the spatial area to be processed (which is formed based on a building plane) is determined based on the building plane corresponding to the area to be processed (such as a building wall, a road surface, a road sign surface and the like).

In some embodiments, the apparatus further includes:
a special effect determining submodule, configured to determine one or more of:
the special effect material to be embedded according to a type of the spatial area to be processed; and
a building type correspondingly according to the area to be processed, and the special effect material to be embedded according to the building type.

In some embodiments, an area type (also called building type) of the area to be processed may be selected from one of a building, a window, a guidepost, a road sign, a road and the like, or a combination thereof.

In some embodiments, the type of the spatial area to be processed includes a three-dimensional space and a two-dimensional space.

In some embodiments, the spatial area to be processed is a three-dimensional space, if the material to be embedded is a three-dimensional special effect material, and a material to be embedded is embedded into the spatial area to be processed. The area to be processed is a two-dimensional space, if the material to be embedded is a two-dimensional special effect material, and the material to be embedded is embedded into the spatial area to be processed.

In some embodiments, an objective plane is determined based on the line feature in the area to be processed, and the spatial area to be processed, which is formed based on the objective plane, is determined according to the objective plane.

In some embodiments, the spatial area to be processed (which is formed based on a building plane) is determined based on the building plane corresponding to the area to be processed (such as a building wall, a road surface, a road sign surface and the like).

In some embodiments, the size of the special effect material to be embedded corresponds to that of the spatial area to be processed or of the area to be processed.

For making the embedded special effect to fit the spatial area to be processed or the area to be processed better, the size of the special effect material to be embedded is of size corresponding to that of the spatial area to be processed or of the area to be processed.

Meanwhile, the special effect material to be embedded is embedded to an external surface of the spatial area to be processed.

Figure 7:
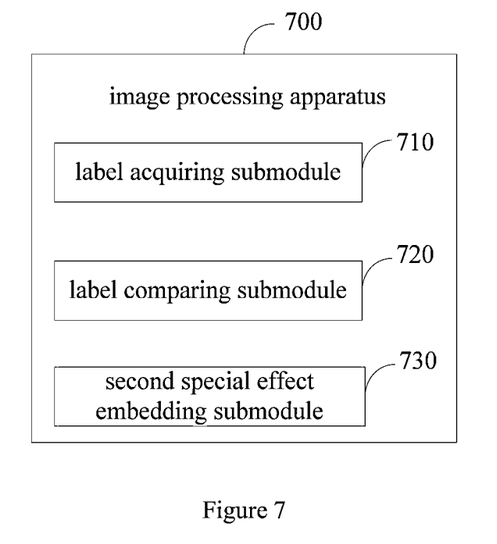
FIG. 7 is a block diagram illustrating an image processing apparatus according to embodiments of the present disclosure.

FIG. 7 is a block diagram illustrating an image processing apparatus according to embodiments of the present disclosure. Referring to FIG. 7, the image processing apparatus 700 includes: a label acquiring submodule 710, a label comparing submodule 720 and a second special effect embedding submodule 730.

The label acquiring submodule 710 is configured to acquire an area label of an image of the area to be processed, based on that a current image frame to be processed is different from a previous image frame.

For reducing the calculation for embedding the special effect material (such as the AR special effect material), in embodiments of the present disclosure the image processing method includes setting a label for each area to be processed, and embedding the same special effect material to be embedded (such as the AR special effect material) into two areas to be processed with a same label, based on that the area labels of the areas to be processed are same between adjacent image frames to be processed.

The label comparing submodule 720 is configured to identify a second area to be processed in the previous image frame according to the area label, in which the area label of the second area to be processed is identical with that of the area to be processed It is judged whether the area label of the area to be processed in the previous image frame is identical to that in the current image frame to be processed. If the area label of the area to be processed in the previous image frame is identical to that in the current image frame to be processed, the area to be processed in the previous image frame is set as a second area to be processed, and the area to be processed is added with the special effect material to be embedded which is same added to the second area to be processed.

The second special effect embedding submodule 730 is configured to embed a second special effect material to be embedded corresponding to the second area to be processed into the area to be processed.

This step achieves tracking of the same object, and further achieves tracking of the area to be processed for the special effect material (such as the AR special effect material). If the camera moves, the special effect material (such as the AR special effect material) embedded into the same area to be processed will be unchanged. If there is a moving car in the area to be processed, its corresponding special effect will follow the moving car all along.

Figure 8:
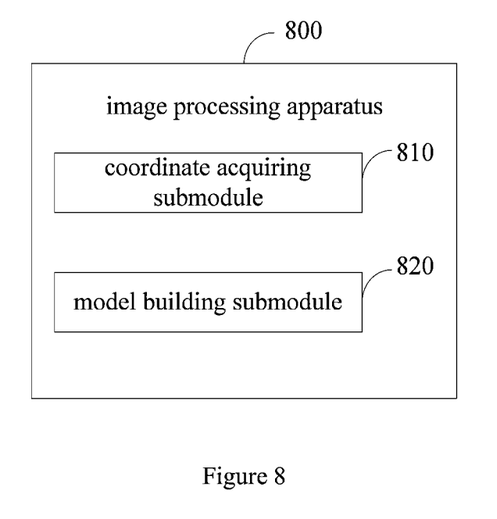
FIG. 8 is a block diagram illustrating an image processing apparatus according to embodiments of the present disclosure.

FIG. 8 is a block diagram illustrating an image processing apparatus according to embodiments of the present disclosure. Referring to FIG. 8, the image processing apparatus 800 includes: a coordinate acquiring submodule 810 and a model building submodule 820.

The coordinate acquiring submodule 810 is configured to generate three-dimensional coordinates corresponding to pixels on the line feature.

For accurately embedding the special effect material (such as the AR special effect material) into the area to be processed, it is needed to acquire three-dimensional coordinates of the area to be processed. At this step, a space model is built according to the line feature in the image frame to be processed, to acquire the three-dimensional coordinates of the area to be processed. The method to establish a three-dimensional space model according to a two-dimensional image is numerous and well-known in the art, which is not covered by the protection scope of the present disclosure. In a possible embodiment, several reference points are selected on the line, two-dimensional coordinates of individual reference points are acquired, and three-dimensional coordinates of the individual reference points are calibrated. A projection matrix is acquired according to the two-dimensional coordinates and the three-dimensional coordinates of the individual reference points, and three-dimensional coordinates corresponding to the pixels on the line are obtained according to the projection matrix. Further, the space model is generated accordingly.

The model building submodule 820 is configured to build the space model according to the three-dimensional coordinates, in which the space model is a three-dimensional model.

After the space model is built, respective three-dimensional coordinates of all pixels in the image of the area to be processed in the space model can be acquired, which is convenient for subsequently embedding the special effect material (such as AR special effect material) into the image of the area to be processed.

The present disclosure further provides in embodiments an electronic device, a computer-readable storage medium and a computer program product.

The electronic device includes: at least one processor, and a memory, connected in communication with said at least one processor, where the memory stores therein an instruction executable by said at least one processor, and said at least one processor is configured to:

determine an area to be processed according to a line feature in an image frame to be processed;

build a space model according to the image frame to be processed; and embed a special effect material to be embedded into the area to be processed according to the space model, to generate a special effect image frame.

The technical solutions provided in embodiments of the disclosure have the following beneficial effects.

The similar area to be processed is acquired according to the area label, which achieves tracking of the same area to be processed in different image frames to be processed, thus reducing calculation caused by image processing, and improving efficiency of embedding the special effect to be embedded into the image frame to be processed.

Figure 9:
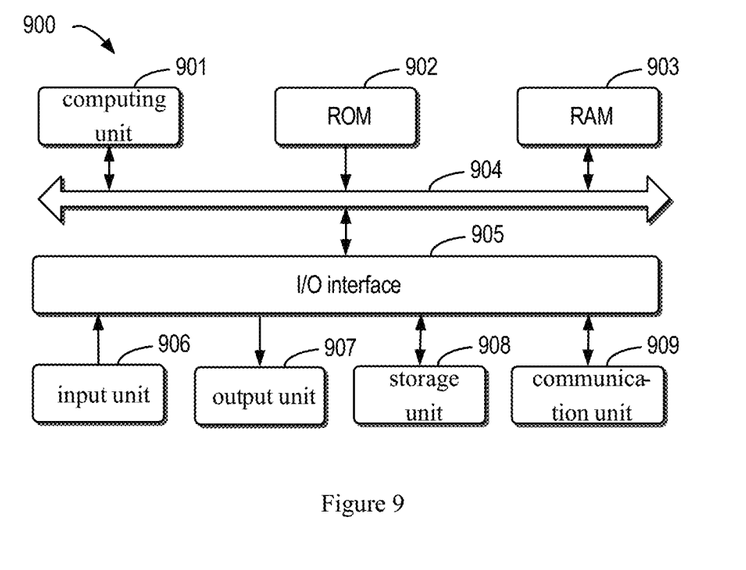
FIG. 9 is a block diagram illustrating an electronic device configured to implement an image processing method according to embodiments of the present disclosure.

FIG. 9 is a block diagram illustrating an electronic device 900 according to embodiments of the present disclosure.

The electronic devices are intended to represent various forms of digital computers, such as a laptop, a desktop, a workstation, a personal digital assistant, a server, a blade server, a mainframe computer, and other suitable computers. The electronic devices may also represent various forms of mobile devices, such as a personal digital processor, a cellular phone, a smart phone, a wearable device, and other similar computing devices. The components shown herein, their connections and relationships, and their functions are described as examples only, and are not intended to limit implementations of the present disclosure described and/or claimed herein.

Referring to FIG. 9, the device 900 includes a computing unit 901 to perform various appropriate actions and processes according to computer program instructions stored in a read only memory (ROM) 902, or loaded from a storage unit 908 into a random access memory (RAM) 903. In the RAM 903, various programs and data for the operation of the storage device 900 can also be stored. The computing unit 901, the ROM 902, and the RAM 903 are connected to each other through a bus 904. An input/output (I/O) interface 905 is also connected to the bus 904.

Components in the device 900 are connected to the I/O interface 905, including: an input unit 906, such as a keyboard, a mouse; an output unit 907, such as various types of displays, speakers; a storage unit 908, such as a disk, an optical disk; and a communication unit 909, such as network cards, modems, wireless communication transceivers, and the like. The communication unit 909 allows the device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include, but are not limited to, a central processing unit (CPU), graphics processing unit (GPU), various specialized artificial intelligence (AI) computing chips, various computing units that run machine learning model algorithms, digital signal processor (DSP), and any suitable processor, controller, microcontroller, etc. The computing unit 901 performs various methods and processes described above, such as an image processing method. For example, in some embodiments, the image processing method may be implemented as computer software programs that are tangibly embodied on a machine-readable medium, such as the storage unit 908. In some embodiments, part or all of the computer program may be loaded and/or installed on the device 900 via the ROM 902 and/or the communication unit 909. When a computer program is loaded into the RAM 903 and executed by the computing unit 901, one or more steps of the image processing method described above may be performed. In some embodiments, in other embodiments, the computing unit 901 may be configured to perform the image processing method in any other suitable manner (e.g., by means of firmware).

Various implementations of the systems and techniques described herein above may be implemented in digital electronic circuitry, integrated circuit systems, field programmable gate arrays (FPGA), application specific integrated circuits (ASIC), application specific standard products (ASSP), system-on-chip (SOC), complex programmable logic device (CPLD), computer hardware, firmware, software, and/or combinations thereof. These various embodiments may include being implemented in one or more computer programs executable and/or interpretable on a programmable system including at least one programmable processor, and the programmable processor may be a special-purpose or general-purpose programmable processor, and may receive data and instructions from a storage system, at least one input device and at least one output device, and may transmit data and instructions to the storage system, the at least one input device, and the at least one output device.

The computer program product includes a computer program that, when executed by a processor, achieves an image processing method as mentioned above, where the method includes:

determining an area to be processed according to a line feature in an image frame to be processed;

building a space model according to the image frame to be processed; and embedding a special effect material to be embedded into the area to be processed according to the space model, to generate a special effect image frame.

Program code for implementing the methods of the disclosure may be written in any combination of one or more programming languages. These program codes may be provided to a processor or controller of a general computer, a dedicated computer, or other programmable data processing device, such that the program codes, when executed by the processor or controller, cause the functions and/or operations specified in the flowcharts and/or block diagrams is performed. The program code can be executed entirely on the machine, partly on the machine, as a stand-alone software package partly on a machine and partly on a remote machine or entirely on a remote machine or server.

A non-transitory computer-readable storage medium having stored therein a computer instruction is provided. The computer instruction is configured to cause a computer to implement an image processing method as mentioned above, where the method includes:

determining an area to be processed according to a line feature in an image frame to be processed;

building a space model according to the image frame to be processed; and embedding a special effect material to be embedded into the area to be processed according to the space model, to generate a special effect image frame.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

To provide interaction with a user, the systems and techniques described herein may be implemented on a computer having a display device (eg, a cathode ray tube (CRT) or liquid crystal display (LCD)) for displaying information for the user; and a keyboard and pointing device (e.g., a mouse or trackball) through which a user can provide an input to the computer. Other types of devices can also be used to provide interaction with the user, for example, the feedback provided to the user may be any form of sensory feedback (eg, visual feedback, auditory feedback, or tactile feedback); and may be in any form (including acoustic input, voice input, or tactile input) to receive the input from the user.

The systems and techniques described herein may be implemented on a computing system that includes back-end components (eg, as a data server), or a computing system that includes middleware components (eg, an application server), or a computing system that includes front-end components (eg, a user computer with a graphical user interface or web browser through which a user can interact with implementations of the systems and techniques described herein), or a computer system including such a backend components, middleware components, front-end components or any combination thereof. The components of the system may be interconnected by any form or medium of digital data communication (eg, a communication network). Examples of the communication network includes: Local Area Networks (LAN), Wide Area Networks (WAN), the Internet and blockchain networks.

The computer system may include a client and a server. The Client and server are generally remote from each other and usually interact through a communication network. The relationship of the client and the server is generated by computer programs running on the respective computers and having a client-server relationship with each other. The server may be a cloud server, also known as a cloud computing server or a cloud host, which is a host product in the cloud computing service system, and solves the defects of difficult management and weak business expansion in traditional physical hosts and virtual private servers ("VPS" for short). The server may also be a server of a distributed system, or a server combined with a blockchain.

It should be understood that the steps may be reordered, added or deleted by using the various forms of flows shown above. For example, the steps described in the present disclosure may be executed in parallel, sequentially, or in different orders, as long as the desired results of the technical solutions disclosed in the present disclosure can be achieved, and no limitation is imposed herein.

The above-mentioned specific embodiments do not limit the scope of protection of the present disclosure. It should be understood by those skilled in the art that various modifications, combinations, sub-combinations and replacements may be made depending on design requirements and other factors. Any modifications, equivalent replacements, and improvements made within the spirit and principles of the present disclosure should be included within the protection scope of the present disclosure.

What is claimed is:

1. An image processing method, comprising:
   determining an area to be processed according to a line feature in an image frame to be processed;
   building a space model according to the image frame to be processed;
   embedding a special effect material to be embedded into the area to be processed according to the space model, to generate a special effect image frame;
   acquiring an area label of an image of the area to be processed, based on that a current image frame to be processed is different from a previous image frame;
   identifying a second area to be processed in the previous image frame according to the area label, wherein the area label of the second area to be processed is identical with that of the area to be processed; and
   embedding a second special effect material to be embedded corresponding to the second area to be processed into the area to be processed.

2. The method according to claim 1, wherein embedding a special effect material to be embedded into the area to be processed according to the space model comprises:
   determining a spatial area to be processed corresponding to the area to be processed in the space model; and
   embedding the special effect material to be embedded into the spatial area to be processed.

3. The method according to claim 2, further comprising one or more of:
   determining the special effect material to be embedded according to a type of the spatial area to be processed; and
   determining an area type correspondingly according to the area to be processed, and determining the special effect material to be embedded according to the area type.

4. The method according to claim 2, wherein a size of the special effect material to be embedded corresponds to that of the spatial area to be processed or of the area to be processed.

5. The method according to claim 1, comprising one or more of:
   determining an objective plane based on the line feature in the area to be processed, and determining a spatial area to be processed according to the objective plane, and
   determining the spatial area to be processed according to a building plane corresponding to the area to be processed.

6. The method according to claim 5, further comprising one or more of:
   determining the special effect material to be embedded according to a type of the spatial area to be processed; and
   determining an area type correspondingly according to the area to be processed, and determining the special effect material to be embedded according to the area type.

7. The method according to claim 1, wherein building a space model according to the image frame to be processed comprises:
   generating three-dimensional coordinates corresponding to pixels on the line feature; and
   building the space model according to the three-dimensional coordinates, wherein the space model is a three-dimensional model.

8. The method according to claim 1, wherein the special effect material to be embedded comprises at least one of:
   a two-dimensional special effect material, and
   a three-dimensional special effect material.

9. An electronic device, comprising:
   at least one processor, and
   a memory, connected in communication with said at least one processor,
   wherein the memory stores therein an instruction executable by said at least one processor,
   wherein said at least one processor is configured to:
   determine an area to be processed according to a line feature in an image frame to be processed;
   build a space model according to the image frame to be processed;
   embed a special effect material to be embedded into the area to be processed according to the space model, to generate a special effect image frame;

acquire an area label of an image of the area to be processed, based on that a current image frame to be processed is different from a previous image frame;

identify a second area to be processed in the previous image frame according to the area label, wherein the area label of the second area to be processed is identical with that of the area to be processed; and embed a second special effect material to be embedded corresponding to the second area to be processed into the area to be processed.

10. The electronic device according to claim 9, wherein said at least one processor is configured to:

determine a spatial area to be processed corresponding to the area to be processed in the space model; and embed the special effect material to be embedded into the spatial area to be processed.

11. The electronic device according to claim 10, wherein said at least one processor is configured to determine one or more of:

the special effect material to be embedded according to a type of the spatial area to be processed; and an area type correspondingly according to the area to be processed, and the special effect material to be embedded according to the area type.

12. The electronic device according to claim 10, wherein a size of the special effect material to be embedded corresponds to that of the spatial area to be processed or the area to be processed.

13. The electronic device according to claim 9, wherein said at least one processor is configured to:

determine an objective plane based on the line feature in the area to be processed, and determine a spatial area to be processed according to the objective plane, and determine the spatial area to be processed according to a building plane corresponding to the area to be processed.

14. The electronic device according to claim 13, wherein said at least one processor is configured to determine one or more of:

the special effect material to be embedded according to a type of the spatial area to be processed; and an area type correspondingly according to the area to be processed, and the special effect material to be embedded according to the area type.

15. The electronic device according to claim 9, wherein said at least one processor is configured to:

generate three-dimensional coordinates corresponding to pixels on the line feature;

build the space model according to the three-dimensional coordinates, wherein the space model is a three-dimensional model.

16. The electronic device according to claim 9, wherein the special effect material to be embedded comprises at least one of:

a two-dimensional special effect material, and a three-dimensional special effect material.

17. A non-transitory computer-readable storage medium having stored therein a computer instruction, wherein the computer instruction causes a computer to implement an image processing method, wherein the method comprising:

determining an area to be processed according to a line feature in an image frame to be processed;

building a space model according to the image frame to be processed;

embedding a special effect material to be embedded into the area to be processed according to the space model, to generate a special effect image frame;

acquiring an area label of an image of the area to be processed, based on that a current image frame to be processed is different from a previous image frame;

identifying a second area to be processed in the previous image frame according to the area label, wherein the area label of the second area to be processed is identical with that of the area to be processed; and embedding a second special effect material to be embedded corresponding to the second area to be processed into the area to be processed.

\* \* \* \* \*